United States Patent Office 2,694,970
Patented Nov. 23, 1954

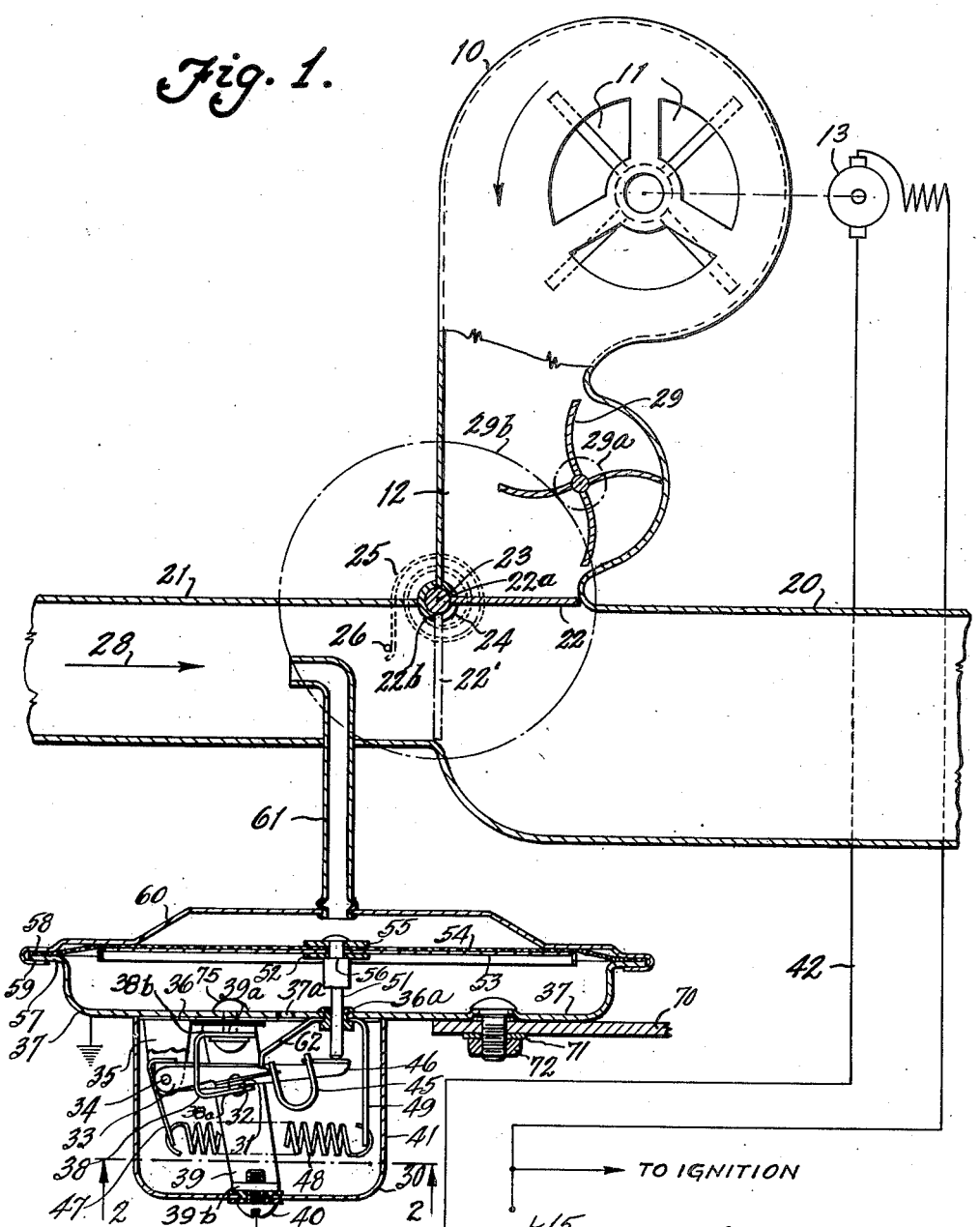

2,694,970

AIR CIRCULATING APPARATUS

Paul L. Schneider, Anderson, Ind., assignor to General Motors Corporation, Detroit, Mich., a corporation of Delaware Application December 1, 1949, Serial No. 130,401

2 Claims. (Cl. 98—2)

This invention relates to heating and ventilating systems for motor cars which provide for the circulation of air in the passenger compartment either by the use of a power driven blower or by air taken in from the front of the car.

One of the chief criticisms of the heating and ventilating systems for motor cars which take outside air from the front of the car is the introduction of air considerably contaminated by exhaust gases from other vehicles into the car. This condition is most serious when the car is being driven at relatively low speeds, or is standing, where congested traffic conditions exist.

One of the advantages of taking the air for the heating and ventilating system from the front of the car is that the use of a power driven blower is not required when the car is being driven at moderate speeds or faster. However, the use of the power driven blower is required to force enough outside air into the car to keep the windows from fogging when the car is being driven at low speeds or is standing. Consequently, the blower could be arranged to take air from a region of relatively low contamination and thus reduce the hazard involved when driving in congested traffic.

An object of this invention is to take advantage of the entrance of air into the heating and ventilating system of the car by impact pressure when the car is driven at higher speeds and to provide for a shift in the place of entrance of the air when the blower is required, so that the entrance of badly contaminated air into the car is avoided.

In the embodiment of the invention, the air pipe leading to the interior of the body is connected by valve either with a duct leading from the front of the vehicle or with the outlet of a blower, said valve being moved automatically to block the outlet of the blower when air pressure in the duct is sufficient, or to block the duct in response to the operation of the blower which is effected automatically when pressure in the duct is insufficient.

Further objects and advantages of the present invention will be apparent from the following description, reference being had to the accompanying drawings, wherein a preferred embodiment of the present invention is clearly shown.

In the drawings:

Fig. 1 is a diagram of the embodiment of the invention, the air pressure controlled switch controlling the blower motor circuit being shown in sections.

Fig. 2 is a sectional view on line 2—2 of Fig. 1, with certain parts omitted.

Referring to Fig. 1, a blower 10 having air inlets 11 and an outlet 12 is driven by an electric motor 13 connected with a current source terminal 14 by the ignition switch 15 and by an automatic switch 30. The current source may be a storage battery 16, or the generator (not shown) which charges the battery. The pipe 20, which leads to the air circulating system of the automobile body, is connected either with the blower outlet 12 or with an air inlet duct 21. The air supplied to the outlet 12 comes from the air inlets 11 arranged in a region around the car of relatively low contamination by exhaust gas of adjacent vehicles. For example, the inlet openings 11 could be under the hood of the car, or the inlet openings could be adjacent an opening in the right front fender. The air inlet duct is connected with a louvre opening at the front end of the automobile. The connection of pipe 20 either with blower outlet 12 or duct 21 is controlled by a valve 22 attached to a shaft 23 pivotally supported by a bearing 24 at the junction of air duct inlet 21 and blower outlet 12. Valve 22 has been moved into this position against a stop 22a of bearing 24 by the action of a torsion spring 25 (attached to shaft 23 and pressing against a fixed pin 26). Normally, valve 22 blocks the blower outlet 12. An air turbine having vanes 29 is connected by gears 29a and 29b with shaft 23. The air turbine is operated by air issuing from the blower 10 when operating. Blower 10 operates when ignition switch 15 is closed and if a normally closed switch of switch unit 30 is closed.

The switch unit 30 comprises a contact 31 normally engaging a contact 32. Contact 31 is carried by a lever 33 pivotally mounted on a pin 34, which is supported by a pair of spaced arms 35 formed integrally with and depending from a plate 36. A tubular rivet 36a assists in securing the plate 36 to a base 37 which is connected by ground with one terminal of the current source. Contact 32 is attached to an arm 38a of a U-shaped bracket 38. An arm 38b of bracket 38 is mechanically and electrically connected with an arm 39a of a U-shaped bracket 39. The arm 38b, arm 39a, and plate 36 is secured to base 37 by rivet 75. The arm 39a, is suitably insulated from the plate 36 and the rivets 75 are suitably insulated from the arms 38b and 39a. The other arm 39b cooperates with a screw 40 to hold a cover 41 against the base 37, said plate 36 being within the confines of the cover. Screw 40, being insulated from the cover 41, serves to connect bracket 39 with a wire 42 connected with one terminal of motor 13 having its other terminal connected with switch 15. Base 37 has a vent 37a communicating with the space within the cover 41 which is not hermetically sealed.

A U-spring 45 is connected with lever 46 which is wider than the lever 33 so that it will straddle same. The lever 46 is also pivoted on the pin 34. The spring 45, normally biases lever 33 clockwise and lever 46 counterclockwise. A spring 48, connected with an extension 47 of lever 46 and with an extension 49 of plate 36, urges lever 46 counterclockwise against a rod 51 passing through the base 37 and through a washer 52, a flanged disc 53, a diaphragm 54, and a washer 55. The rod is riveted over to clamp the parts 52—55 against a shoulder 56 of rod 51. The periphery of diaphragm 54 is clamped between the flange 57 of base 37 and the flange 58 of a cover 60, said flange 58 being bent around at 59 against the flange 57. Cover 60 provides together with the diaphragm 54 an air pressure chamber connected with a pipe 61 which extends within the duct 21 and which is bent to face toward the air current indicated by arrow 28. Normally, the spring 45 is in such position with respect to its connection with levers 33 and 46 that its plane will be located below the axis of pivot pin 34 so that the lever 33 is normally urged clockwise. The vent 37a so restricts the flow of air out from or into the diaphragm chamber as the diaphragm moves so that surging of the switching action is minimized.

When the ignition switch 15 is closed preparatory to starting the engine, the motor 13 operates the blower 10. Air flowing from the blower causes vanes 29 to rotate counterclockwise and valve 22 rotates clockwise into position 22′ indicated by dot-and-dash line when in this position the valve 22 engages stop 22b and blocks duct 21. When car speed attains the value such that the pressure of air in duct 21, moving in the direction of arrow 28, is adequate for proper circulation of air in the car body the pressure on the diaphragm 54 will become sufficient to overcome the spring 48. Therefore lever 46 will move clockwise to such a distance that its point of contact with spring 45 is moved below a plane passing through the pivot point of lever 33 and its point of contact with spring 45 whereby the biasing effect of spring 45 is directly reversed so that lever 33 is quickly shifted counterclockwise into engagement with stop 62 provided by the plate 36. Therefore contact 31 separates from contact 32 and the current source is disconnected from the motor 13 and the blower 10 stops.

Spring 25 causes valve 22 to return to position blocking the blower outlet 12 and opening duct 21 to pipe 20.

The switch unit 30 is supported by a bracket 70 to which the base 37 is attached by studs arranged to pass through openings in the bracket 70 and receive lock washers 71 and nuts 72.

While the embodiment of the present invention as herein disclosed, constitutes a preferred form, it is to be understood that other forms might be adopted.

What is claimed is as follows:

1. An air circulating apparatus comprising in combination, a pair of ducsts joined at one end thereof to form a single passage, a blower connected to one of said ducts, the other of said ducts being subjected to flow of air in response to forward movement thereof, a valve disposed adjacent the junction of said ducts and normally biased to close said first duct and operable under predetermined conditions to open the first duct and to close the second of said ducts, a control device responsive to air flow in the second duct adapted to control operation of the blower and normally biased so that said blower is operative, means in said second duct responsive to predetermined air flow therein for operating said control device to render the blower inoperative upon predetermined air flow within said second duct, and means in the first duct responsive to air flow caused by said blower in said first duct for positively opening said valve in the first duct and causing said valve to close said second duct.

2. Apparatus as claimed in claim 1, wherein the means for positively operating the valve comprise a turbine wheel in said duct geared to said valve whereby movement of air in the duct as caused by the blower, moves the turbine wheel which in turn through said gearing moves the valve to open said first duct and close the second duct.

References Cited in the file of this patent

UNITED STATES PATENTS

| Number | Name | Date |
| --- | --- | --- |
| 1,488,225 | Baetz | Mar. 25, 1924 |
| 1,990,753 | Rapp | Feb. 12, 1935 |
| 2,032,572 | Hammers et al. | Mar. 3, 1936 |
| 2,257,967 | Le Fevre et al. | Oct. 7, 1941 |